(12) United States Patent
Smith

(10) Patent No.: US 6,581,628 B2
(45) Date of Patent: Jun. 24, 2003

(54) PRESSURE REDUCING VALVE ASSEMBLY

(75) Inventor: David M. Smith, Emporia, KS (US)

(73) Assignee: Vektek, Inc., Emporia, KS (US)

( * ) Notice: Subject to any disclaimer, the term of this patent is extended or adjusted under 35 U.S.C. 154(b) by 0 days.

(21) Appl. No.: 09/858,374

(22) Filed: May 16, 2001

(65) Prior Publication Data

US 2002/0170601 A1 Nov. 21, 2002

(51) Int. Cl.$^7$ ............................................. G05D 16/02
(52) U.S. Cl. ............................ 137/454.2; 137/454.6; 137/505.42
(58) Field of Search ....................... 137/454.2, 505.42, 137/454.5; 251/64

(56) References Cited

U.S. PATENT DOCUMENTS

| | | | |
|---|---|---|---|
| 1,832,863 A | | 11/1931 | Hewitt |
| 2,348,388 A | | 5/1944 | Jenkins |
| 3,348,573 A | | 10/1967 | Bradford |
| 3,414,336 A | | 12/1968 | Atkin et al. |
| 4,942,899 A | | 7/1990 | Vork et al. |
| 5,107,887 A | * | 4/1992 | White et al. ............ 137/505.42 |
| 5,113,898 A | | 5/1992 | White et al. |
| 5,413,096 A | * | 5/1995 | Hart ..................... 137/505.42 |
| 5,501,247 A | * | 3/1996 | Miller .................. 137/505.41 |
| 5,711,340 A | * | 1/1998 | Gusky et al. .......... 137/505.42 |
| 5,829,477 A | * | 11/1998 | Graham et al. ......... 137/454.6 |
| 5,931,182 A | | 8/1999 | Craft et al. |
| 5,971,013 A | | 10/1999 | Beau et al. |

* cited by examiner

*Primary Examiner*—Stephen M. Hepperle
(74) *Attorney, Agent, or Firm*—Hovey Williams LLP

(57) ABSTRACT

A pressure reducing valve assembly (10) for receiving fluid from a high pressure line and delivering the fluid to a low pressure line includes an elongated tubular body (12), a pressure reducing valve (14) having a single, valved opening (54) interposed between high and low pressure ports (68), (70), and a pressure reducing reservoir (16) defined substantially between the body (12) and the pressure reducing valve (14). The pressure reducing reservoir (16) comprises the only substantial fluid communication between the body (12) and the pressure reducing valve (14) and fluidly communicates with the high pressure port (68) by the single, valved opening (54). In preferred forms, the pressure reducing valve (14) includes a valve insert (64) housing a spring (62) that, among other functions, serves as a reset valve to further reduce the space requirements and decreasing the cost and complexity of the valve assembly (10).

9 Claims, 2 Drawing Sheets

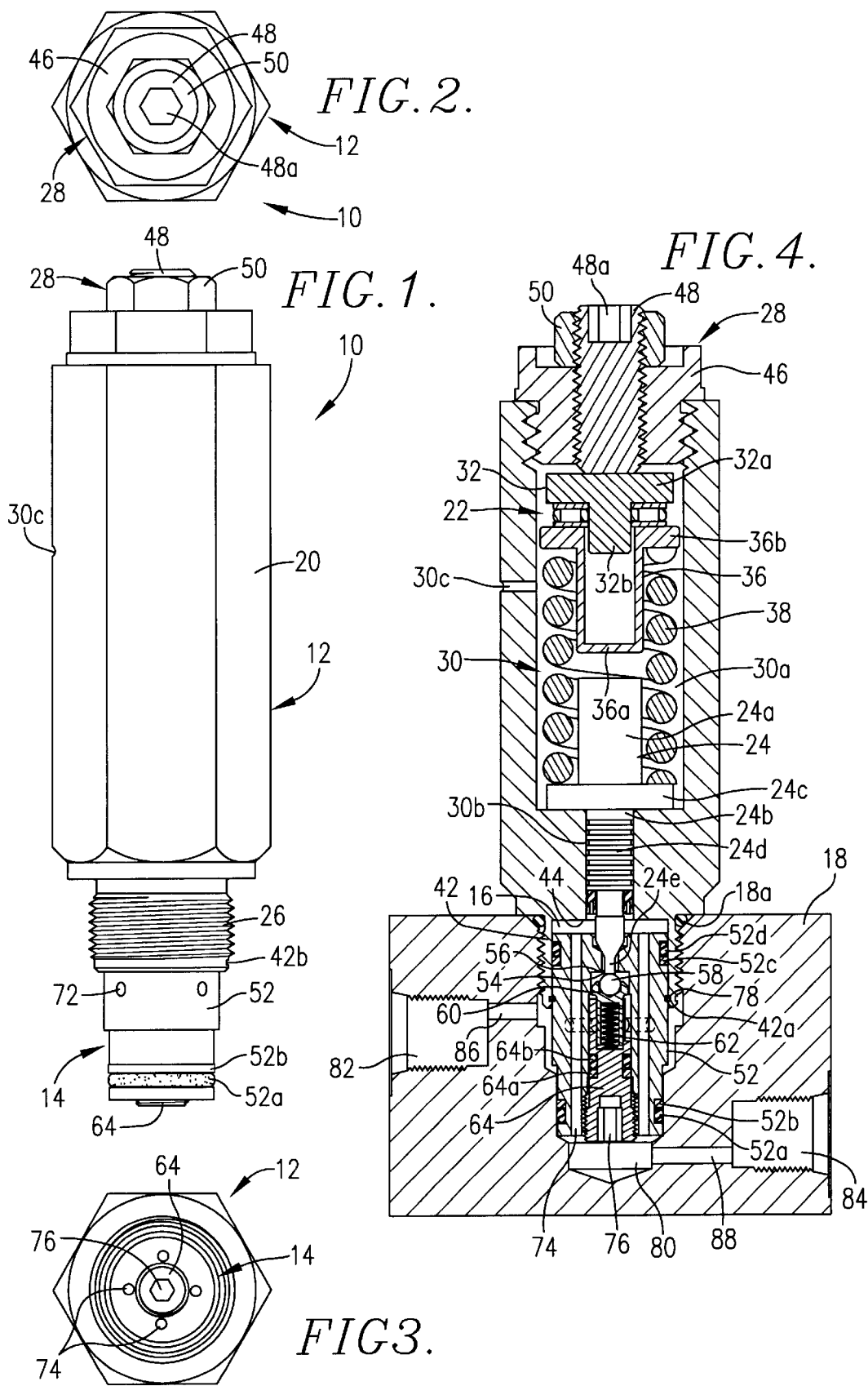

PRESSURE REDUCING VALVE ASSEMBLY

BACKGROUND OF THE INVENTION

1. Field of the Invention

The present invention relates to pressure reducing valves, such as are used for reducing the pressure of hydraulic fluid supplied from a common high pressure source and delivered to low pressure components of a hydraulic circuit. More particularly, the invention relates to a pressure reducing valve assembly having a single, valved opening interposed between high and low pressure ports therefore providing for a simple, cost-effective, durable construction relative to more parts-intensive conventional valves.

2. Discussion of Prior Art

Pressure reducing valves are commonly used when it is desired to use a common high pressure fluid source (e.g., a pump) to supply multiple components of a hydraulic circuit wherein one or more of the components require low pressure fluid and one or more of the components require high pressure fluid. For example, in a hydraulic clamping system having a single pump and multiple clamps operating at various pressure levels, a pressure reducing valve may be interposed between the high pressure hydraulic pump and one or more low pressure clamps. The valve delivers low pressure fluid to the selected clamps while allowing the remaining clamps to operate at a higher fluid pressure, thus eliminating the need for a separate hydraulic pump for each required pressure level.

A problem with prior art pressure reducing valves is that they are typically bulky and therefore require a great deal of space. This is problematic in applications where space is limited such as in clamping operations where numerous clamps requiring different fluid pressure levels may be mounted to a single fixture.

Another problem with prior art pressure reducing valves is that they are not efficiently designed and therefore include a large number of parts. This not only increases the overall size of the valves, which contributes to the problems described above, but also increases the cost and the complexity of the valves.

SUMMARY OF THE INVENTION

The present invention solves the above-described problems and provides a distinct advance in the art of pressure reducing valves by providing a pressure reducing valve assembly having a single, valved opening and limited fluid communication with a body providing a compact and efficiently designed valve with a fewer number of parts.

One embodiment of the pressure reducing valve assembly of the present invention broadly includes an elongated tubular body, a pressure reducing valve including a single, valved opening interposed between high and low pressure ports, and a pressure reducing reservoir defined substantially between the body and the pressure reducing valve. The pressure reducing reservoir comprises the only substantial fluid communication between the body and the pressure reducing valve and fluidly communicates with the high pressure port by the single, valved opening.

In preferred forms, the pressure reducing valve includes an inner chamber housing a spring that, among other functions, serves as a reset valve to further reduce the space requirements and decreasing the cost and complexity of the valve assembly.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 1 is a side elevational view of a pressure reducing valve assembly constructed in accordance with a preferred embodiment of the present invention;

FIG. 2 is a plan view of the valve assembly;

FIG. 3 is a bottom view of the valve assembly;

FIG. 4 is a vertical sectional view of the valve assembly—with the spool and ball valve illustrated in elevation—shown mounted to the base and illustrating the pressure reducing valve out of its closed position;

DETAILED DESCRIPTION OF THE PREFERRED EMBODIMENT

Figure 5:
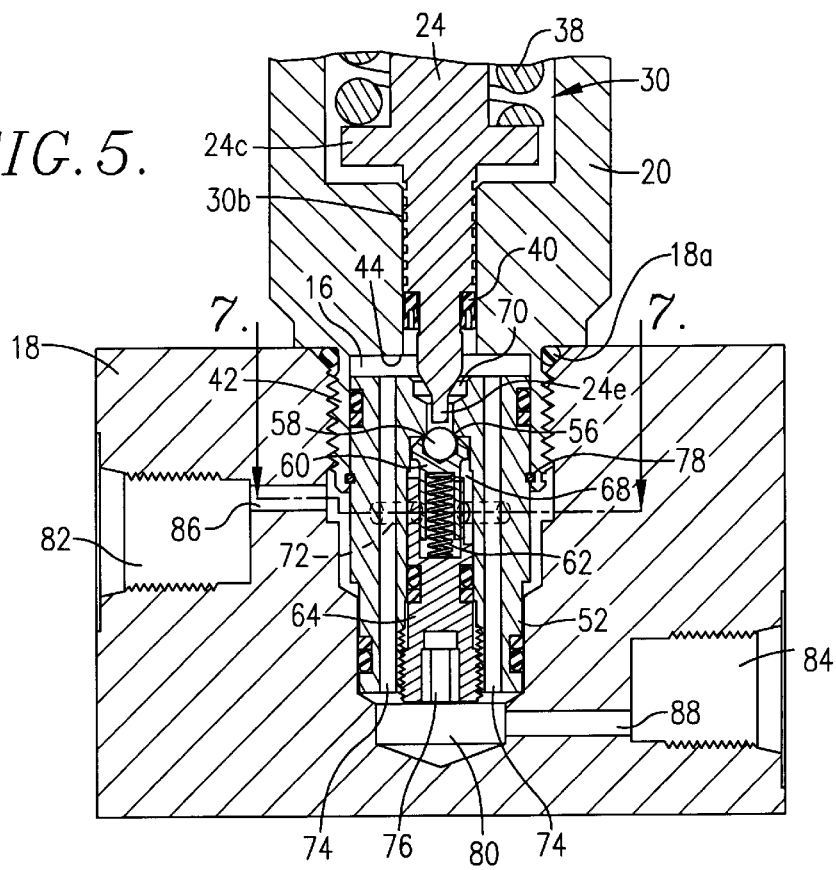
FIG. 5 is a fragmentary vertical sectional view of the valve assembly—with the ball valve illustrated in elevation—shown mounted to the base and illustrating the pressure reducing valve in its closed position.

FIG. 1 illustrates a pressure reducing valve assembly 10 constructed in accordance with a preferred embodiment of the present invention and configured for receiving fluid from a high pressure line and delivering the fluid to a low pressure line. The valve assembly 10 broadly includes an elongated tubular body 12, a pressure reducing valve 14 having a single, valved opening, a pressure reducing reservoir 16 defined therebetween, and a base 18 which can be threadably coupled with the body 12 so that the valve 14 is disposed therebetween (see FIG. 4).

Turning initially to FIGS. 1 and 4, the body 12 is generally cylindrical and includes a hollow upper spring-housing section 20 that houses a spring assembly 22 and a spool 24, and a relatively diametrically smaller lower valve-receiving section 26. A cap assembly 28 is threadably coupled to the open upper end of the upper section 20.

The upper body section 20 has a hexagonal shaped exterior sidewall defining a cylindrically shaped internal spool-receiving chamber 30 (see FIG. 4). The chamber 30 comprises an enlarged spring-receiving section 30a at its upper end and a diametrically smaller stem-receiving section 30b at its lower end. The spring-receiving section 30a preferably includes a vent aperture 30c bored through the sidewall providing air communication between the chamber 30 and the atmosphere so that no undesired motion-inhibiting air pressure buildup occurs in the otherwise sealed chamber 30.

The spring assembly 22 is housed within the section 30a and includes a spring guide 32, a needle bearing 34, a spring support 36, and a compression spring 38. The spring guide 32 has a disk shaped distal section 32a having a smooth, flat top surface that abuts the protruding portion of a set screw (as will be subsequently described). The distal section 32a is diametrically larger than the portion of the set screw that projects into the chamber 30. The spring guide 32 has a cylindrical shaped proximate section 32b configured to slidably engage the spring support 36 (see FIG. 4). The needle bearing 34 is received on the proximate section 32b so that it is disposed between the bottom surface of the distal section 32a and the top of the spring support 36. The spring support 36 is generally cylindrical shaped having a center bore 36a and a rimmed portion 36b. The bore 36a is configured to receive the proximate section 32b of the guide 32. The support 36 is configured so that the cylindrical portion is received within the upper throat of the spring 38 and the rimmed portion 36b is engagingly disposed between the needle bearing 34 and the upper-most coil of the spring 38. The upper end of the compression spring 38 is received on the spring support 36 and the lower end is received on the spool 24.

The spool 24 includes a cylindrically shaped spring-receiving portion 24a at its upper end, a diametrically smaller stem 24b at its lower end, and a retention disk 24c generally at its center (see FIG. 4). The spring-receiving portion 24a is configured to be received within the lower end of the spring 38 so that the lower-most coil of the spring 38 abuts the top surface of the disk 24c. The disk 24c is configured to move freely within the spring-receiving section 30a of the chamber 30 but is prevented from entering the stem-receiving section 30b thereof. The stem 24b is configured to be slidably and sealingly received in the stem-receiving section 30b of the chamber 30. The upper portion of the stem 24b is cylindrically shaped and has exterior circumferential grooves 24d. The grooves 24d provide a means for any fluid that leaks into the chamber 30 to seal between the stem 24b and the surface of the stem-receiving section 30b. This provides a backup seal for the chamber 30 and facilitates the alignment and sliding of the stem 24b relative to the stem-receiving section 30b of the chamber 30. The lower portion of the stem 24b is bottle shaped and has a diametrically reduced neck 24e configured to be received by the valve 14. The lower portion of the stem 24b is diametrically smaller than its upper portion so that a lip seal 40 can be couplably received thereon (see FIG. 5). The seal 40 provides a fluid-tight seal between the chamber 30 and the valve 14 so that substantially no fluid enters the chamber 30. As previously discussed, small amounts of fluid are expected to leak around the moving seal 40, however, this fluid will be captured in the grooves 24d.

The lower valve-receiving section 26 is integrally formed with the upper body section 20 and includes a cylindrically shaped, externally threaded sidewall 42 defining a central bored valve-receiving chamber open at its lower end. The sidewall 42 includes a circumferential wire-receiving groove 42a extending along the inside surface and an associated wire-receiving aperture 42b opposite the groove 42a and located on the outside surface of the sidewall 42. The upper and lower body sections 20, 26 share a common chamber-dividing wall 44 having a central stem-receiving aperture operable to slidably receive the stem 24b.

The cap assembly 28 includes a hexagonal shaped cap 46, a set screw 48 screwably received therein, and a lock washer 50 operable to lockingly couple the cap 46 and the screw 48. The cap 46 includes external threading for mating it to the upper section 20 and the hexagonal shape is operable to receive a driving device (e.g., a wrench) for facilitating the mating. The cap 46 further includes an axial bore spanning the entire width of the cap 46 and having internal threading for receiving the set screw 48. The set screw 48 has external, complemental threading for mating to the cap 46 and includes a center bored recess 48a operable to receive a driving device (e.g., an allen wrench) for facilitating the mating. The set screw 48 has an axial length greater than the width of the cap 46 so that both ends of the screw 48 extend beyond the respective top and bottom surfaces of the cap 46. The screw 48 is screwably received within the cap 46 so that the extent its proximate end extends into the upper section 20 is adjustable, for example, by using a driving device in the recess 48a. Once the desired position is achieved, the lock washer 50 is threaded onto the screw 48 until it is flush with the top surface of the cap 46 so that the screw 48 is retained in the desired position.

The pressure educing valve 14 includes a valve body 52, a single valved opening 54, a valve seat 56, ball valve 58, a ball retainer 60, a spring 62, and a valve insert 64. The valve body 5 is generally cylindrically shaped and has an upper end configured to sealably engage the valve-receiving chamber in the lower body section 26 and a lower end configured to sealably engage the base 18. The valve body 52 includes circumferential grooves at each end for receiving 0-ring type valve seals 52a,52b,52c,52d that facilitate the fluid seal between the valve body 52 and the corresponding valve-receiving chamber and base 18. The valve body 52 has a circumferential wire-receiving groove 66 and an associated aperture (not shown) located toward the center o its upper end that cooperate to receive wire (as will subsequently be described) o retain the position of the valve 14 relative to the lower body section 26. The valve body 52 is diametrically smaller at its lower end (relative to its upper end) to facilitate mating to the base 18.

Figure 7:
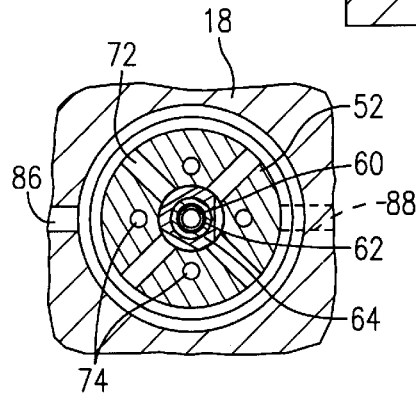
FIG. 7 is a horizontal cross-sectional view taken substantially along line 7—7 of FIG. 5.

The valve body 52 has an internal central bore defining a high pressure chamber 68 and a low pressure chamber 70 with the single valved opening 54 disposed therebetween. The high pressure chamber 68 has a stepped configuration with internal threading on its lower-most step. The low pressure chamber 70 has a generally conical shape complementing the bottle shaped portion of the stem neck 24e. The valve body 52 includes a high pressure port comprising a plurality of fluid-receiving channels 72 located generally along the center circumferential surface and extending into the high pressure chamber 68 (see FIG. 7). The valve body 52 further includes a low pressure port comprising a plurality of fluid-discharging channels 74 along its top surface that are bored the entire axial length of the valve body 52 (see FIGS. 4 and 7). The fluid-discharging channels 74 must not intersect either the fluid-receiving channels 72 or the high and low pressure chambers 68, 70.

The single valved opening 54 is defined along the internal central bore of the valve body 52 disposed between the high pressure chamber 68 and the low pressure chamber 70. Although there are other openings in the valve 14 (e.g., the channels 72, 74), the opening 54 is the only opening that fluidly connects the high pressure side of the valve 14 (i.e., the high pressure line, the fluid-receiving channels 72, and the high pressure chamber 68) with the low pressure side of the valve (i.e., the low pressure line, the fluid-discharging channels 74, and the low pressure chamber 70). The opening 54 is also the only valved opening in the valve assembly 10. The valve seat 56 is defined by shoulders formed in the lower end of the low pressure chamber 70 at the opening 54 (see FIG. 6).

The ball valve 58 rides in the ball retainer 60 and is shiftable into and out of a closed position as shown in FIG. 5 wherein the ball valve 58 is in sealing engagement with the valve s at 56. The ball valve is configured to completely close the opening 54 when in the closed position so that fluid communication between the high and low pressure chambers 68,70 is prevented. The ball retainer 60 is configured to be slidably received within the upper-most step of the high pressure chamber 68. The retainer 60 is generally cylindrically shaped having a ball-receiving cup 60a at its upper end configured to receive the ball valve 58 so that a sufficient portion of the ball valve 58 protrudes out of the pup 60a to seal the opening 54 when the valve 14 is in the closed position. The upper end of the retainer 60 further includes a flange 60b that both prevents the retainer 60 from retracting too far into the valve insert 64 and facilitates maintaining engagement of the ball valve 58 with either the stem 24b or the valve seat 56 (e.g., high pressure fluid exerts a lifting force against the underside of the flange 60b). The retainer 60 includes a central spring-receiving bore in its lower end configured to receive the spring 62 and having a bleeder vent 60c therein to prevent undesired hydraulic locking conditions. The spring 62 is received in this bore and is configured to exert a spring force between the retainer 60 and the insert 64 sufficient to maintain substantially constant engagement of the ball valve 58 with either the stem 24b (i.e., when the valve 14 is pot in the closed position) or the valve seat 56 (i.e., when the valve 14 is in the closed position). The spring force of the spring 62 must be such that it never overcomes the spring force of the compression spring 38 (i.e., the spring 62 does not cause the spool 24 to move).

The valve insert 64 is configured to be sealingly received within the high pressure chamber 68 of the valve body 52. The lower end of the insert 64 includes external circumferential threading, configured to threadably mate the insert 64 to the internal threading of the valve body 52, and a center bored recess 76 operable to receive a driving device (e.g., an allen wrench) for facilitating the mating. The insert 64 includes a circumferential groove generally located at the center of the insert 64 (but in any event below the fluid receiving channels 72 of the valve body 52) and operable to receive O-ring type insert seals 64a,64b. The upper end of the insert 64 includes a central bore operable to receive the spring 62 and the lower end of the ball retainer 60 (see FIG. 4). The upper end of the insert 64 has a triangular shaped perimeter that further defines the high pressure chamber 68 to provide clearance for high pressure fluid moving through the chamber 68 (see FIG. 7). The upper end of the insert 64 is further configured so that when it is fully received in the valve body 52, it does not protrude into the upper-most step of the high pressure chamber 68. This allows sufficient clearance for the ball valve 58 (and the retainer 60) to slide into and out of the closed position.

The pressure reducing reservoir 16 is defined in the lower body section 26 between the upper end of the valve 14 and the chamber-dividing wall 44. The valve 14 is pressure fit into the lower body section 26 and a lock wire 78 is wound into the wire-receiving grooves 42a,66 to maintain a reservoir defining position (see FIGS. 4 and 6). Particularly, the wire 78 has a crimped end that fits through the wire-receiving aperture 42b in the lower section sidewall 42 and is received in the aperture in the groove 66 on the valve body 52. The valve body 52 is then rotated to wind the wire 78 into the grooves 42a,66. The pressure reducing valve 14 and the body 12 are not designed to be uncoupled once they have been mated together (for manufacturing purposes they have been machined as separate components), therefore, the wire-receiving aperture 42b in the sidewall 42 can be closed after the mating is completed to prevent uncoupling of the components, for example, by peening it closed. Fluid in the reservoir 16 is low pressure fluid and the reservoir 16 provides adequate clearance to allow the fluid passing through the opening 54 to enter the fluid-discharging channels 74. As will subsequently be described in detail, the reservoir 16 provides the only fluid communication between the body 12 and the valve 14.

Figure 6:
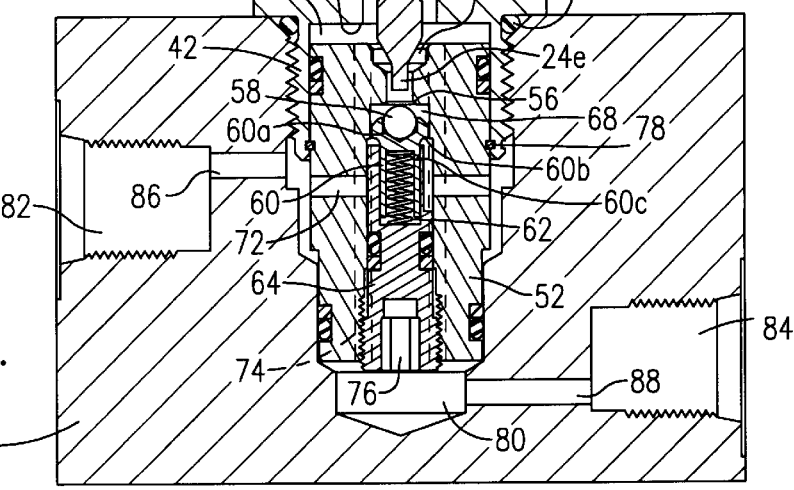
FIG. 6 is a fragmentary vertical sectional view of the valve assembly—with the ball valve illustrated in elevation—shown mounted to the base and illustrating the pressure reducing valve in a reset orientation.

As illustrated in FIGS. 4, 5, and 6, the valve assembly 10 is attached to the base 18. The base 18 includes a recess 80, inlet and outlet ports 82, 84, respectively, and corresponding fluid passageways 86, 88. The recess 80 is configured to sealingly receive the valve 14 mated to the body 12. The recess 80 includes threading operable to threadably receive the external threading of the lower section 26 of the body 12. An O-ring type base seal 18a prevents fluid leakage between the body 12 and the base 18. The inlet and outlet ports 82, 84 include internal threading for connecting with externally threaded high and low pressure lines, respectively. The fluid passageways 86, 88 provide fluid communication between the inlet and outlet ports 82, 84, respectively, and the corresponding fluid-receiving and fluid-discharging channels 72, 74.

OPERATION

High pressure fluid (e.g., 5000 psi) from the high pressure line (originating from a high pressure fluid source such as a pump) enters the pressure reducing valve assembly 10 through the inlet port 82 of the base 18, where it passes through the fluid passageway 6 into the fluid-receiving channels 72 and enters the high pressure chamber 68 of the pressure reducing valve 14. When fluid is initially delivered to the inlet port 82 the valve assembly 10 is in the state illustrated in FIG. 4. Specifically, the compression spring 38 overcomes the spring force of the spring 62 and biases the pressure reducing valve 14 out of the closed position. The neck 24e of the stem 24b protrudes though the opening 54 displacing the ball valve 58 off of the valve seat 56. The ball valve 58 is retained in the ball-receiving cup 60a of the ball retainer 60 which is depressed into the central bore of the valve insert 64. Fluid freely flows from the high pressure chamber 68 through the single valve opening 54 into the low pressure chamber 70. Once in the low pressure chamber 70, fluid is received in the pressure reducing reservoir 16, passes through the fluid-discharging channels 74 through the fluid passageway 88 out the outlet port 84 and into the low pressure line where it is delivered to a low pressure component such as a clamp.

Fluid freely flow into the low pressure line until the fluid pressure reaches a pre-selected operating level (e.g., 750 to 4500 psi), wherein the valve assembly 10 shifts into the state illustrated in FIG. 5. Specifically, fluid pressure in the reservoir 16 exerts a force against the stem 24b that overcomes the spring force in the compression spring 38 causing the neck 24e of the stem 24b to recess out of the opening 54 and allowing the force of the spring 62 to simultaneously slide the ball valve 58 into sealing engagement with the valve seat 56 (corresponding to the valve 14 being in the closed position). When the valve 14 is in the closed position, fluid is prevented from flowing through the opening 54 between the high and low pressure chambers 68,70. The pressure differentiation between the high and low pressure chambers 68,10 occurs at the single valved opening 54. Fluid in the high pressure chamber 68 is under high pressure and fluid in the low pressure chamber 70 is under low pressure.

The pre-selected operating level pressure is selected in accordance with the needs of the low pressure component being controlled by the valve assembly 10. The illustrated valve assembly 10 is capable of delivering low pressure fluid at a pressure between 500 psi and 4500 psi. The valve assembly 10 is set to control this level by adjusting the set screw 48 until the desired spring force in the compression spring 38 is achieved—i.e., a spring force that is completely overcome only by fluid pressure at or just above the operating level pressure. To increase the spring force exerted by the compression spring 38, the screw 48 is turned in a clockwise direction when viewed from above as illustrated in FIG. 2 so that it protrudes further into the spool-receiving chamber 30 and further depresses the spring guide 32. To decrease the spring force exerted by the compression spring 38, the process just described is reversed. As the fluid pressure approaches the pre-selected operating level, it will begin to overcome the spring force of the compression spring 38 thereby causing the stem 24b to retract out of the opening 54. As the ball valve 58 slides toward the closed position, less fluid is allowed through the opening 54; however, until the spring force of the compression spring 38 is completely overcome and the stem 24b fully retracts out of contact with the ball valve 58, some fluid passes between the high and low pressure chambers 68,70.

The valve assembly 10 provides and maintains low pressure fluid in the low pressure line at a constant and steady pressure. The valve assembly 10 reacts only to pressure changes in the low pressure line (except when performing its reset function as described below). The valve 14 is shifted into and out of the closed position based on the pressure level in the low pressure chamber 70. The valve 14 does not react to pressure changes in the high pressure line with one exception: the valve 14 provides a reset function if the fluid pressure in the high pressure chamber 68 drops sufficiently below the fluid pressure in the low pressure chamber, for example if the fluid source is shut off and/or does not maintain static high pressure conditions. This pressure differential will overcome the spring force of the spring 62 causing the ball retainer 60 to retract into the valve insert 64 and shifting the ball valve 58 off of the valve seat 56 (corresponding to the valve assembly 10 being in the state illustrated in FIG. 6). Accordingly, the century spring 62 provides a reset function obviating the need for a separate reset valve. The state depicted in FIG. 6 is illustrated for descriptive purposes only. In application, depending on the conditions, the valve assembly construction, and the valve settings, the force of the compression spring 38 may instantaneously overcome the reduced pressure in the low pressure chamber 70 as the ball valve 58 shifts off of the valve seat 56, thereby shifting the assembly 10 into the state illustrated in FIG. 4.

The preferred forms of the invention described above are to be used as illustration only, and should not be utilized in a limiting sense in interpreting the scope of the present invention. Obvious modifications to the exemplary embodiment, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A pressure reducing valve assembly for receiving fluid from a high pressure line and delivering the fluid to a low pressure line, the valve assembly comprising:
    an elongated tubular body having a vent operable to prevent air pressure buildup within the body and including a compression spring housed therein;
    a pressure reducing valve including a high pressure port for receiving fluid from the high pressure line, a low pressure port for delivering fluid to the low pressure line, a single valved opening, and an inner chamber interposed between the opening and the high pressure port and fluidly communicating therewith so that fluid pressure in the chamber is substantially the same as fluid pressure in the high pressure port;
    a pressure reducing reservoir defined substantially between the body and the pressure reducing valve,
    said pressure reducing valve being shiftable into and out of a closed position, wherein fluid communication between the inner chamber and the pressure reducing reservoir is prevented,
    said pressure reducing reservoir comprising the only substantial fluid communication between the body and the pressure reducing valve,
    said high pressure port fluidly communicating with the pressure reducing reservoir by said single valved opening,
    said pressure reducing reservoir fluidly communicating with the low pressure port so that fluid pressure in the reservoir is substantially the same as fluid pressure in the low pressure port; and
    a base having an inlet port operable to fluidly communicate with the high pressure line, an outlet port operable to fluidly communicate with the low pressure line, and a single valve port operable to receive the pressure reducing valve such that the pressure reducing valve may be completely removed with the body through the valve port,
    said base being coupled to the body wherein the pressure reducing valve is disposed ther between so that the inlet port is in fluid communication with the high pressure port and the outlet port is in fluid communication with the low pressure port.

2. The valve assembly as claimed in claim 1,
    said compression spring providing a yieldable biasing force operable to yieldably bias the pressure reducing valve out of the closed position.

3. The valve assembly as claimed in claim 2,
    said yieldable biasing force provided by the compression spring being adjustable.

4. The valve assembly as claimed in claim 3,
    said pressure reducing valve being a ball-type valve including a ball valve and a valve seat.

5. The valve assembly as claimed in claim 4,
    said body including a stem cooperating with the compression spring and the ball valve to shift the pressure reducing valve into and out of the closed position.

6. The valve assembly as claimed in claim 5,
    said pressure reducing valve including a spring housed in the inner chamber and operable to yieldably bias the ball valve against the stem when the pressure reducing valve is out of the closed position and operable to yieldably bias the ball valve against the valve seat when the pressure reducing valve is in the closed position.

7. A pressure reducing valve assembly for receiving fluid from a high pressure line and delivering the fluid to a low pressure line, the valve assembly comprising:
    a body assembly including
        elongated tubular body having a first end and a second end,
        a cap assembly threaded into the first end of the body,
        a valve receiving section disposed at the second end of the body, the valve receiving section having threaded exterior sidewalls and substantially smooth interior sidewalls,
        a chamber disposed between the first end and the second end of the body, a vent through the body and operable to prevent air pressure buildup within the chamber, a spool operable to slide within the second end of the housing and seal between the chamber and the valve retaining section thereby preventing fluid from entering the chamber from the valve retaining section, and a spring disposed in the chamber and operable to exert a variable force between the cap assembly and the spool according to a pressure setting selected through the cap assembly;

a pressure reducing valve disposed within the valve receiving section and including a high pressure port for receiving fluid from the high pressure line, a low pressure port for delivering fluid to the low pressure line, a substantially spherical ball disposed between the high pressure port and the low pressure port, a seat operable to seal with the ball thereby preventing fluid from passing from the high pressure port to the low pressure port, and wherein the spool engages the ball such that the ball is displaced from the seat when the low pressure port experiences pressure less than the pressure setting selected through the cap assembly;

a pressure reducing reservoir defined substantially between the body and the pressure reducing valve;

a base having a single valve port operable to receive the body and the pressure reducing valve such that the body and the pressure reducing valve may be completely removed through the valve port.

8. The valve assembly as claimed in claim 7, wherein the cap assembly may be removed from the body thereby allowing the body assembly to be completely disassembled and including a cap, a set screw threaded into the cap, and a lock washer operable to lock the screw within the cap thereby setting the pressure setting.

9. The valve assembly as claimed in claim 7, wherein valve is sealed to the substantially smooth interior sidewalls of the valve receiving section of the body with at least one ring seal thereby allowing the valve to slide into and out of the body for ease of assembly and disassembly.

* * * * *